Jan. 31, 1967   A. VAN SCHYNDEL ETAL   3,300,937
STEEL MAT STRUCTURE FOR REINFORCED CONCRETE SLABS
Filed Jan. 10, 1964

INVENTORS:
Andreas van SCHYNDEL
Günther SCHMIDT
BY
ATTORNEY

United States Patent Office 3,300,937
Patented Jan. 31, 1967

3,300,937
STEEL MAT STRUCTURE FOR REINFORCED
CONCRETE SLABS
Andreas van Schyndel, Sturzelberg, near Neuss, and
Günther Schmidt, Dusseldorf, Germany, assignors to
Bau-Stahlgewebe G.m.b.H., Dusseldorf, Germany, a
company of Germany
Filed Jan. 10, 1964, Ser. No. 336,922
Claims priority, application Germany, Jan. 12, 1963,
B 70,313
8 Claims. (Cl. 52—581)

The present invention relates to reinforcing structures for use in connection with concrete construction parts, more particularly slabs, plates, floors, walls and the like, said structures consisting of a steel mat assembly made of intersecting steel rods or bars joined at their crossing points.

Reinforced concrete structures are frequently required in considerable widths, whereby to make it necessary or desirable to construct the same in the form of a plurality of oblong rectangular mat units composed of intersecting longitudinal and cross bars and assembled in juxtaposed and mutually overlapping relation to provide a mat of desired width and to ensure a continuous flux of force across the entire breadth of the structures.

Where the structures are loaded one-sidedly, or subjected to tensile stress in the longitudinal dimension of the units only, the minimum overlap of the cross bars of adjacent units corresponds, from the static point of view, to the distance between two longitudinal bars arranged at right angle to said cross bars. In the case of structures subjected to tensile stress in both coordinate dimensions, that is, in the longitudinal as well as crosswise direction, the extent of the overlap should amount to about three times the spacing distance between the longitudinal bars. Expressed in conventional orders of magnitude, the minimum overlap in the case of one-sided loading amounts to about 10 cm. and in the case of crosswise loading to about 30 cm. in concrete structures of this type.

In order to ensure a continuous flux of force or smooth transition from unit to unit within the assembled structure, the mere overlap of the cross bars is not sufficient. For the same reason that for reinforcements consisting of single bars only the ends of the bars must be firmly anchored, such as by the provision of hooks or the like, it is necessary in the case of mesh structures having overlapping cross bars to provide for adequate anchoring effect by the longitudinal bars within the overlap regions of the assembled structures.

As a consequence, there occurs in the overlap regions twice the number of bars extending at right angle to the overlapping cross bars, whereby, with the bars having an equal or constant spacing distance as well as being of equal diameter, the relative cross-section of the longitudinal bars within the overlap regions, compared with the concrete cross-section, will be twice the amount required for static or structural reasons, that is, to provide the required resistance to tension or bending stresses within said regions. In other words, the marginal bars within the overlap regions, serving to effect anchoring and extending parallel to the longitudinal edges of the mat units, are not utilized in a static sense to their fullest extent or capacity, whereby to involve a substantial waste of steel and resulting in increased cost of the structures.

Reinforcing steel mats of the type referred to have already become known heretofore being constructed to achieve a better utilization of the longitudinal bars within the overlap regions from a static point of view. On the other hand, with mats of this type a new problem has arisen in the endeavor to maintain the overlap width between adjacent mat units at a minimum, while ensuring the necessary continuity of the flux of force across the breadth of the composite structure, on the one hand, and to limit the unavoidable excess length of the cross bars, on the other hand, to minimize the amount of excess steel or material required.

Thus, a mat structure has become known the longitudinal bars of which are of the same diameter and wherein the marginal bars within the overlap region of the units are spaced by twice the distance compared with the bar spacing distance within the intermediate regions of the mats. The mat units in the assembled position are so overlapped as to cause to marginal bars of one unit to coincide with the center of the gaps or meshes of an adjacent unit of the assembly, in such a manner that all the bars within the assembled structure are spaced by the same distance and the resistance to loading stress is the same across the entire breadth of the structure.

With an arrangement of the foregoing type, all the longitudinal bars within the overlap regions are more or less fully utilized in a static sense, though at the expense of a considerable amount of excess steel for the cross bar overlap. If the cross bars are unloaded or free from stress, two meshes must be provided within the overlap regions having a width equal to twice the distance between the longitudinal bars within the intermediate regions of the mats. Furthermore, if both the longitudinal and cross bars are loaded or subjected to tensile stress, four meshes are required within an overlap region having a width equal to twice said distance. In constructing such mat structures in accordance with the prevailing static or structural requirements, that is, with an overlap in case of one-sided loading being equal to a single mesh and with an overlap equal to three meshes in case of crosswise loading of the structures, the overlap width will amount to 1.5 meshes in the former case and to 3.5 meshes in the latter case, respectively. In this connection, it must be considered that said meshes have a width being twice the width of the meshes within the intermediate mat regions.

As a consequence, the use of mats constructed in the afore-described manner will result in the requirement of a considerable amount of excess steel or increase of the length of the cross bars, inasmuch as the statically required overlap is exceeded to a substantial degree by the cross bars overlapping each other in the assembled structures to an extent far beyond that required from a static or structural point of view. As a matter of fact, the amount of excess steel may be so great, especially where the cross bars are subjected to loading, as to render illusory the original concept of utilizing all the longitudinal bars within the overlap regions. As a result, the initially intended saving of steel may be nullified or converted into an excess consumption or requirement.

An important object of the present invention is therefore the provision of a concrete reinforcing mat assembly of the type referred to which, while using rods or bars of equal diameter throughout, will require a minimum of excess reinforcing material as a result of the overlap of the cross bars of the mat units in the assembled structures.

As the thickness of the concrete slabs, plates, or the like structures reinforced by steel mats of the type described is reduced more and more, a new problem arises as a result of the concomitant reduction of the statically useful or "effective height" or width of the slabs within the overlap regions, which reduction, though small ordinarily, may become appreciable from a practical point of view. The reduction of the effective height is predicated on the fact that the centre of gravity of the two superposed horizontal bars separated by a transverse or cross bar as at a higher level compared with the centre of gravity of a single bar or rod.

In the case of concrete construction units of average thickness, the foregoing reduction of the effective height is practically negligible. As an example, for a slab thickness of about 15 cm. the necessary increase in steel cross-section to compensate for the reduction, or to avoid excess tensile stress within the overlap regions, would still be within the admissable tolerance range of ±3% prevailing for concrete structures of this type. On the other hand, with a slab thickness of 10 cm., the required increase in steel cross-section, to avoid excess stress within the overlap regions, amounts to about 7%, while with a slab thickness of 7 cm. a 10% increase of the steel cross-section would be required to compensate for the effective height reduction.

Another object of the invention is, therefore, the provision of relatively simple means to reduce or minimize the effects of the "effective height" reduction in concrete slabs or the like structures of the type referred to and having a relatively small height or thickness.

Where relatively large diameter steel bars are required, the reduction of the effective height may be as high as 1 cm., whereby a still greater excess stress may be involved in the overlap regions of structures of this type. With the conventional steel mats, a peak excess tension of more than 3% may not be tolerated, since with mats or assemblies of this type a uniform cross-section is achieved per unit width to eliminate excess overlap.

Yet another object of the invention is the provision of a concrete slab or the like structure embodying multiple reinforcing steel mat units of the type referred to, wherein the total amount of steel required is reduced to an absolute minimum for a desired maximum tensile stress on the structures subjected to either one-sided or crosswise loads, respectively.

The invention, both as to the foregoing and ancillary objects as well as novel aspects thereof, will be better understood from the following detailed description, taken in conjunction with the accompanying drawing forming part of this specification and in which.

Figure 1:
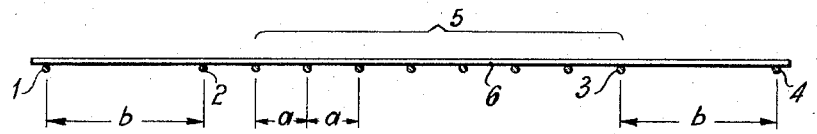
FIG. 1 is a schematic cross-section through a reinforcing mat or constructional unit embodying the principles of the invention.
Figure 3:
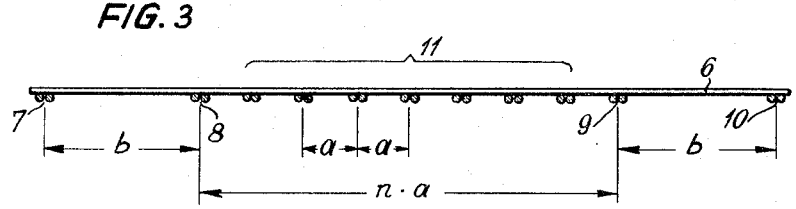
Figure 4:
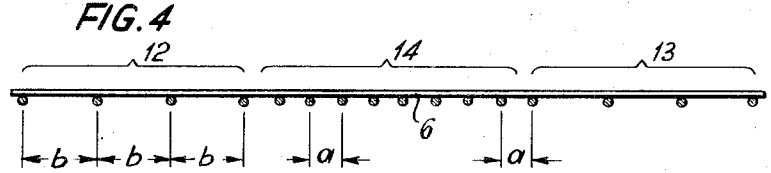
Figure 5:

FIG. 3 being similar to FIG. 1 shows an aiternative construction of a mat unit according to the invention;

FIG. 4 shows still another construction of a reinforcing steel mat unit according to the invention; and FIG. 5 shows a pair of mat units according to FIG. 4 in assembled position and embedded in a concrete slab or the like structure.

Like reference characters denote like parts in the different views of the drawing.

With the foregoing objects in view, the invention involves generally the provision of a multiple reinforcing steel mat assembly of the type referred to and designed for use in concrete slabs, plates and the like structures, wherein the rods or bars of the oblong rectangular mat units are of like cross-section or diameter and the longitudinal bars of each unit are spaced from each other by a greater distance within at least one of the edge or marginal zones of the units, compared with the bar spacing distance within the remaining or intermediate regions of said units. In other words, according to the invention, at least one pair of the overlapping marginal longitudinal bars at one end of the units is spaced by a greater distance than the intermediate bars. More particularly, the spacing distance of the marginal bars being superimposed in the assembled or final structures is so related to the spacing distance of the remaining or intermediate bars of the units as to secure a desired, including equal, resistance to tensile stress of both the main and overlap regions and for loads or stresses on the slab or plate in either a single (longitudinal) or both (longitudinal and crosswise) direction, respectively, in respect to the dimensions of said units. In order to achieve this purpose and result, the marginal longitudinal bars may have a greater spacing distance on both edges of the units compared with the spacing distance in the centre. However, the spacing distances need not be the same on both edges in that, for example, the increased spacing distance on one edge of the units may be different from the increased spacing distance at the opposite edge of said units with only one edge zone having bars of increased spacing in the limit condition.

Other details and features of the invention will become further apparent as the following description proceeds in reference to the drawing.

Referring to the latter, FIG. 1 shows schematically and by way of example a reinforcing steel mat or construction unit in accordance with the invention, wherein the longitudinal bars 1–5 shown in section intersect and are secured to the cross bars 6, all said bars having the same diameter or cross-section. The marginal longitudinal bars 1, 2 and 3, 4, respectively, at each edge of the mat are spaced by the same distance $b$ which is greater than the distance $a$ between the remaining or intermediate bars 5 of the units.

Figure 2:
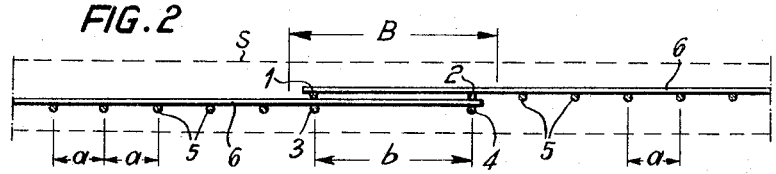
FIG. 2 shows a pair of unit mats according to FIG. 1 in assembled position and embedded within a concrete slab or the like structure in accordance with the invention.

Such a mat unit, according to one aspect of the invention, may be assembled with one or more similar units for the production of a concrete slab, plate, or the like structures of any desired width or lateral dimensions by the provision of suitable overlap regions B of the adjacent mat units comprising either a single mesh, FIG. 2 or multiple meshes FIG. 5, of the marginal bars within the overlap regions.

In an arrangement comprising a plurality of mat units as shown by FIG. 2, all the longitudinal bars 1, 2, 3, 4 within the overlap region are substantially fully statically utilized, the width B of said region representing the theoretical overlap width of the units. In other words, the bars 1, 2, 3, 4 are effective within the region B in such a manner as to exclude local excess stresses for lack of adequate concrete reinforcement.

By a suitable choice of the distance $b$ between the marginal bars, the total cross-section per unit width of the bars within the overlap region of any two adjacent mats may be varied in any desired manner. As will be understood, this cross-section per unit width is the same within the overlap regions and the remaining or intermediate portions of the mats if the distance $b$ equals twice the distance $a$. An especially favorable condition may be obtained by a steel cross-section per unit width within the overlap regions being somewhat greater than the steel cross-section per unit width within the intermediate regions in an effort to compensate at least in part for the reduced "effective height" or useful width of the structures, especially in the case of relatively thin slabs, plates or the like construction parts, in a manner readily understood from the foregoing.

In other words, in using steel mat structures according to the present invention the spacing distance $b$ between the marginal bars within the overlap region B may be so chosen as to secure a closely defined steel cross-section per unit width within the overlap regions, compared with the intermediate portions of the mats or units. The smaller the distance $b$, the greater will be the added steel reserve within the overlap regions. The lower limit of the distance $b$ will be reached when the marginal longitudinal bars assume the spacing distance of the intermediate bars, as will be understood.

Expressed in different words, in the inventive construction, while requiring a minimum of excess steel, the total cross-section of the marginal bars within the overlap regions of adjacent mat units is equal to or of the order of magnitude of the total cross-section per unit width within the intermediate regions of the units, whereby to result in substantially uniform stresses throughout the entire breadth of the slabs, plates or the like concrete structures.

Simultaneously with a decrease of the distance $b$, the overlap width B and, in turn, the size of the cross-bars 6 is decreased whereby to reduce the amount of excess steel required compared with a unitary mat structure having a width equivalent to the multiple mat assembly. The most favorable distance between the marginal bars 1, 2, 3 and 4 in the case of unloaded cross-bars 6 is found to be between $b=2a$ and $b=3a$, wherein $a$ represents the spacing distance between the intermediate bars 5. With both the longitudinal and cross bars being loaded or subjected to tensile stresses, the optimum distance has been found to be between $b=1.7a$ and $b=2.3a$.

The longitudinal bars 1–5 may be of any alternative design, such as in the form of juxtaposed multiple rods as shown at 7, 8, 9, 10 and 11 in FIG. 3 comprising, by way of example, a single marginal mesh of width $b$ and $n$ intermediate meshes of width $a$, in a manner analogous to FIG. 1.

While the FIG. 1 construction is especially suitable for mat structures subjected to longitudinal tensile stresses only, FIG. 4 shows an alternative construction designed especially for use in connection with structures subject to both longitudinal and crosswise loads. According to this embodiment sets of four longitudinal marginal bars 12 and 13, respectively, at an increased spacing distance $b$ are provided compared with the spacing distance $a$ of the intermediate bars 14.

FIG. 5 shows a concrete slab assembly including a pair of reinforcing mats constructed in accordance with FIG. 4, wherein the greater number of overlapping marginal bars 12 and 13 are provided on account of the increased overlap width B', compared with FIG. 2, that is, resulting in a three-mesh overlap in the example illustrated.

Assuming, in accordance with the foregoing, an upper limit for the distances $b$ equal to $3a$, for the case of unloaded cross bars 6, and an upper limit $b$ equal to $2.3a$, for the case of loaded cross bars, no appreciable excess in steel cross-section will be required compared with the intermediate regions, while achieving a substantially uniform reinforcing action over the entire breadth of the assembly or utilizing the reinforcing marginal bars at substantially full capacity.

In determining the distance $b$ within the marginal zones or regions, it may be advantageous, in the interest of achieving intermediate values of the reinforcing cross-section, to provide marginal bars 1, 2, 3, 4 at an increased spacing distance $b$ at one edge only of the units, that is, either of the bars 1, 2 or 3, 4, respectively, in the example shown and compared with the spacing distance $a$ between the intermediate bars 5. In such a case the bars within the remaining marginal zones may either have the same spacing distance as the bars within the intermediate regions or, alternatively, they may have a spacing distance of an intermediate value between the spacing distances of the marginal and intermediate bars, respectively.

In the foregoing the invention has been described in reference to specific illustrative devices or structures. It will be evident, however, that variations and modifications, as well as the substitution of equivalent parts or elements for those shown herein for illustration, may be made without departing from the broader spirit and purvue of the invention as defined by the appended claims. The specification and drawing are accordingly to be regarded in an illustrative rather than in a limiting sense.

We claim:
1. In a reinforced concrete structure of the type described, a concrete slab having embedded therein a reinforcing mat, said mat being comprised of a plurality of oblong rectangular mat units each consisting of longitudinal bars of equal diameter and spaced crossbars intersecting and secured to said longitudinal bars, said units being arranged in juxtaposed relation with at least two marginal longitudinal bars of one unit overlying a corresponding overlying marginal bar of an adjacent unit, and the marginal bars on at least one side of said units having a spacing distance in excess of the spacing distance of the intermediate longitudinal bars of the units.

2. In a reinforced concrete structure as claimed in claim 1 being subjected to tensile load in the longitudinal dimension only of said units, wherein two marginal bars are provided of increased spacing distance and encompassing a range of from two to three times the spacing distance between said intermediate bars.

3. In a reinforced concrete structure as claimed in claim 1 being subjected to tensile load in both the longitudinal and crosswise dimensions of said units, wherein four marginal bars are provided of increased spacing distance and encompassing a range of from 1.7 to 2.3 times the spacing distance between said intermediate bars.

4. In a reinforced concrete structure as claimed in claim 1, wherein the overlying marginal bars are spaced by a distance about twice the spacing distance of the intermediate bars, to cause the total metal cross-section per unit width in the marginal zone to be substantially equal to the total metal cross-section per unit width in the intermediate zone of said slab.

5. In a reinforced concrete structure as claimed in claim 1, said slab having a thickness to result in a substantial reduction of the effective height in the marginal overlap zones compared with the intermediate zones thereof, and the overlying marginal bars being spaced by a distance less than twice the spacing distance of the intermediate bars, to cause the total metal cross-section per unit width in the marginal zones to exceed the total metal cross-section per unit width within the intermediate zones of the slab by an amount to substantially compensate for the effective height reduction.

6. In a reinforced concrete structure as claimed in claim 1, wherein said units include marginal bars of equal increased spacing distance, relative to the spacing distance of said intermediate bars, within both opposite longitudinal edge zones thereof, respectively.

7. In a reinforced concrete structure as claimed in claim 6, wherein said units include marginal bars of different increased spacing distance, relative to the spacing distance of said intermediate bars, within the opposite longitudinal edge zones thereof, respectively.

8. In a reinforced concrete structure as claimed in claim 1, wherein said units include marginal bars of increased spacing, relative to the spacing distance of the intermediate bars, within one of the longitudinal edge zones thereof only.

References Cited by the Examiner

UNITED STATES PATENTS

FOREIGN PATENTS

| | | |
|---|---|---|
| 570,900 | 9/1958 | Belgium. |
| 1,062,914 | 8/1959 | Germany. |
| 1,132,311 | 6/1962 | Germany. |

HARRISON R. MOSELEY, *Primary Examiner.*

A. I. BREIER, *Assistant Examiner.*